United States Patent
Jiang et al.

(10) Patent No.: US 9,809,771 B2
(45) Date of Patent: Nov. 7, 2017

(54) CARBONACEOUS SUBSTANCE GASIFICATION DEVICE AND METHOD

(71) Applicant: ChangZheng Engineering Co., Ltd., Beijing (CN)

(72) Inventors: Congbin Jiang, Beijing (CN); Wei Xin, Beijing (CN); Honghai Li, Beijing (CN); Ruiheng Gao, Beijing (CN); Yongjin Chen, Beijing (CN); Xiaofei Li, Beijing (CN); Yan Zhang, Beijing (CN); Li Zhang, Beijing (CN)

(73) Assignee: ChangZheng Engineering Co., Ltd., Beijing (CN)

( * ) Notice: Subject to any disclaimer, the term of this patent is extended or adjusted under 35 U.S.C. 154(b) by 0 days.

(21) Appl. No.: 15/038,801

(22) PCT Filed: Nov. 21, 2014

(86) PCT No.: PCT/CN2014/091822
§ 371 (c)(1),
(2) Date: May 24, 2016

(87) PCT Pub. No.: WO2015/074589
PCT Pub. Date: May 28, 2015

(65) Prior Publication Data
US 2016/0355742 A1 Dec. 8, 2016

(30) Foreign Application Priority Data
Nov. 25, 2013 (CN) .......................... 2013 1 0606678

(51) Int. Cl.
*C01B 3/02* (2006.01)
*C10J 3/86* (2006.01)
(Continued)

(52) U.S. Cl.
CPC .................... *C10J 3/86* (2013.01); *C01B 3/02* (2013.01); *C01B 3/50* (2013.01); *C10J 3/485* (2013.01);
(Continued)

(58) Field of Classification Search
CPC ........ C10J 2300/0973; C10J 2200/156; C10J 3/14; C10J 2300/093; C10J 2300/1253;
(Continued)

(56) References Cited

U.S. PATENT DOCUMENTS 7,452,392 B2 * 11/2008 Nick .................... C10J 3/08
422/232

FOREIGN PATENT DOCUMENTS

CN       1994865 A       7/2007
CN      102634379 A  *   8/2012
(Continued)

OTHER PUBLICATIONS

International Preliminary Report on Patentability, PCT/CN2014/091822, filed Nov. 21, 2014, priority of Nov. 25, 2013 in the name of Changzheng Engineering Co., Ltd. dated Mar. 2, 2015.

*Primary Examiner* — Colleen Dunn
*Assistant Examiner* — Syed Iqbal
(74) *Attorney, Agent, or Firm* — Fox Rothschild LLP

(57) ABSTRACT

A carbonaceous substance dry powder gasification device and method, the device comprising from bottom to top a lower cooling and purification section (1), a gasification reaction section (2), a cooling reaction section (3) and an upper cooling and purification section (4); an initial cooling device is disposed at the connection between the cooling reaction section and the gasification reaction section; and a plurality of nozzles are circumferentially arranged in the gasification reaction section. The method comprises: a gasification reaction is conducted between a carbonaceous substance and an oxygenated gasifying agent to generate
(Continued)

crude synthesis gas and ash; part of the crude synthesis gas and most of the ash go downstream for cooling and gasification, and the cooled and ash removed crude synthesis gas is transferred to subsequent processes, and the quenched ash is discharged through an ash outlet; the remaining crude synthesis gas and fly ash go upstream to mix with a cooling substance for cooling, and then are transferred to the cooling reaction section for reacting with the incompletely reacted carbon and added gasification agent; the crude synthesis gas and the fly ash are cooled and purified to remove the fly ash, and the clean low-temperature crude synthesis gas is transferred to subsequent processes. The method avoids ash blocking at an ash outlet in an upstream air-exhaust method, and also avoids overheating at the top in a downstream air-exhaust method, thus improving the carbon conversion rate.

8 Claims, 1 Drawing Sheet

(51) Int. Cl.
| | | |
|---|---|---|
| *C10J 3/50* | (2006.01) | |
| *C01B 3/50* | (2006.01) | |
| *C10J 3/48* | (2006.01) | |
| *C10J 3/84* | (2006.01) | |

(52) U.S. Cl.
CPC .............. *C10J 3/506* (2013.01); *C10J 3/84* (2013.01); *C01B 2203/04* (2013.01); *C01B 2203/0877* (2013.01); *C10J 2300/093* (2013.01); *C10J 2300/0976* (2013.01); *C10J 2300/1853* (2013.01)

(58) Field of Classification Search
CPC ...... C10J 3/08; C10J 2300/0969; C10J 3/723; C10J 2300/0916; C10J 2300/0989; C10J 2300/0946; C10J 2300/1807; C10J 2300/1659; C10J 2300/0903; C10K 1/003; C10K 1/004; C10K 1/101; C10K 1/005; C10K 1/026; C10K 1/12; Y02E 50/32; Y02P 20/145
See application file for complete search history.

(56) References Cited

FOREIGN PATENT DOCUMENTS

| | | | | |
|---|---|---|---|---|
| CN | 202898362 U | | 4/2013 | |
| CN | 102634379 B | * | 4/2014 | |
| CN | 203602566 U | | 5/2014 | |
| JP | H10306284 A | | 11/1998 | |
| NL | 0150533 B2 | * | 8/1994 | .............. C10J 3/466 |

\* cited by examiner

CARBONACEOUS SUBSTANCE GASIFICATION DEVICE AND METHOD

CROSS-REFERENCE TO RELATED APPLICATIONS

This application is a U.S. National Phase of International Application No. PCT/CN2014/091822, filed Nov. 21, 2014, which claims priority to China Application No. 201310606678.X, filed Nov. 25, 2013, the disclosures of which are incorporated herein by reference.

FIELD OF THE INVENTION

The present invention relates to a device of and a method of carbonaceous substance gasification, especially for a device and a method to daily process more than 2000 ton of compressed pulverized coal to create synthesis gas.

BACKGROUND OF THE INVENTION

The development of the modern petrochemical industry nowadays is more focusing on large scale production, and the clean coal pulverization technique is directed into the scale expansion of high pressure pulverization equipment. But all of the existing pulverization equipment has unsolved issues.

The development of maximizing the single nozzle gasifiers is restricted by the transportation of the coal.

Multiple nozzles gasifiers utilizing synthesis gas upflowing process can be further expanded. However, the fluid cinder is flowing in a direction which is opposite to the synthesis gas flowing direction, so the moment the fluid cinder fall into the cinder pool, it will create certain amount of low temperature steam, which also flows opposite to the flowing direction of the fluid cinder into the chamber through the cinder or slag exit, so that the temperature of the fluid cinder drops. Therefore, when the fluid cinder unevenly falls, it's usual that the fluid cinder solidifies before reaching to the cinder pool. And since the heat is not enough to melt the solid cinder, so the solid cinder accumulates until the cinder exit is blocked, which eventually causes the equipment breakdown.

Multiple nozzles gasifiers using synthesis gas downflowing process also can be further expanded. Nevertheless, in order to fully utilizing the space in the chamber, usually the nozzles are arranged on the upper chamber where close to the top of the gasifiers, so during the process, the high temperature gas and fluid cinder keeps eroding the top of the gasifier chamber, may cause the temperature excursion on the top of the chamber so that it may potentially lead to safety issues.

SUMMARY OF THE INVENTION

One object of the present invention is to provide a device for carbonaceous substance powder gasification, which can reduce the possibilities of cinder block and temperature excursion on the top of the chamber. This device comprises multiple parts or sections configured vertically. See FIG. 2.

Another object of the present invention is to provide a method of carbonaceous substance powder gasification which can reduce the possibilities of cinder block and temperature excursion on the top of the chamber.

On one hand, the present invention provides a method of carbonaceous substance powder gasification, characterized in: including the following steps:

i) The carbonaceous substance reacts with an oxygen-containing gasification agent and generate the crude synthesis gas in which the main components are CO and H2 and the ashes and cinder in which main components is inorganic substance;

ii) Part of the high temperature crude synthesis gas and most of the ashes and cinder flow down to be cooled and purified, then the cooled and dust-eliminated crude synthesis gas is delivered to the following procedures, the quenched ashes cinder are exhausted from the equipment through the cinder exit (i.e. slag exit), wherein, said "most of" is for instance more than 50%, preferably more than 55%, preferably more than 60%, preferably more than 65%, preferably more than 70%, preferably more than 75%, preferably more than 80%, preferably more than 85%, etc.;

The rest part of the crude synthesis gas (for instance about 70%) and the flying ashes go up and mix with the cooling material to lower the temperature, then enter into the cooling reaction part or section, so that the carbon which is not fully reacted will again react with the supplemented gasification agent, then further improve the carbon conversion and lower the temperature, and the ratio of hydrogen:carbon is also raised; then the crude synthesis gas after the reaction and the ashes are cooled and purified, the ashes in the crude synthesis gas is eliminated, so the low temperature crude synthesis gas which is relatively clean, will be sent to the following procedures.

Said cooling material can also be water, water mist, water with the inert gas (CO2, N2), water with synthesis gas, or synthesis gas.

In the present invention, cooling is mainly realized by exchanging the heat with the cooling materials in order to lower the temperature.

Purifying is realized mainly by utilizing gravity, inertial force to separate the gas and particles.

Lowering the temperature is meant to spray in certain amount of cooling material to lower the temperature of the mixed gas till a certain point (Ex. 900° C.); cooling means to spray in excessive amount of cooling material, sufficiently exchanges the heat with the gas, so the temperature difference of before the cooling and after the cooling would be even bigger.

Purifying includes eliminating the dust and liquid drops in the synthesis gas, and eliminating the dust does not include eliminating water.

According to one embodiment of the present invention, characterized in,

In step i), using nozzles to spray the carbonaceous substance and the gasification agent into the gasification reaction part or section of the device. According to one embodiment of the present invention, characterized in, in the environment of high temperature (1200° C. to 2000° C.) and high pressure (0.1 MPa to 11 MPa), the carbonaceous substance and the gasification agent rapidly react. Usually under the certain pressure, the reaction temperature will be changing. In the present invention, said rapid reaction refers to the reaction which finishes in less than 10 seconds, 90% of the reaction finishes in 5 seconds.

According to one embodiment of the present invention, characterized in: in step ii), said "the rest part" is about 60%-80% (volume/volume) of the total synthesis gas, preferably about 75% (volume/volume).

According to one embodiment of the present invention, characterized in: in step ii), said gasification agent is water steam, water mist or CO2, or a mixture thereof.

According to one embodiment of the present invention, characterized in: in step ii), said temperature at which the cooling reaction is proceeding between about 800° C.-t2 (softening temperature of the ashes), wherein the ashes, i.e. the flying ash, is oxidized.

According to one embodiment of the present invention, characterized in, when the slag block occurs at the slag outlet which causes the pressure rising at the slag outlet, it is feasible to increase the volume of gas going downwards and slowly raise the temperature at the slag outlet, so that the redundant slag can be melted, until the pressure at the slag outlet goes back to normal.

On the other hand, the present invention provides a carbonaceous substance powder gasification device, characterized in, including a bottom cooling purification part or section 1, a gasification reaction part or section 2, a cooling reaction part or section 3, and a upper cooling purification part or section 4;

Said bottom cooling purification part 1 is set at the bottom of the device, its inlet is connected with the lower outlet of gasification reaction part 2;

Said gasification reaction part 2 is set at the lower part from the middle of the device. Multiple nozzles are arranged around the periphery of gasification reaction part 2, the bottom outlet of said gasification reaction part 2 is connected with the bottom cooling purification part 1, and its upper outlet is connected with the cooling reaction part 3.

Said cooling reaction part 3 is set on the upper part from the middle of the device, its inlet is connected with the upper outlet of the gasification reaction part 2, a primary cooling device 31 is arranged at the connected part, to spray a proper amount of cooling materials, so on one hand cooling the gas, and on the other hand complementing the reactant, to further proceed the carbon gasification reaction in the cooling reaction part 3, so that the hydrogen:carbon ratio of the synthesis gas can be increased;

Said upper cooling purification part 4 is set on the top of the device, its inlet is connected with the outlet of the cooling reaction part 3.

According to one embodiment of the present invention, characterized in, said bottom cooling purification part includes a rapid cooling device, a slag pool, a slag outlet, a synthesis gas outlet.

According to one embodiment of the present invention, characterized in, multiple nozzles are arranged around the periphery of said gasification reaction part, said nozzles can be set on 1 layer or level, or on multiple levels.

According to one embodiment of the present invention, characterized in, said nozzles are set at the lower part from the middle of the gasification chamber, so that during the reaction, the high temperature gas and liquid cinders are far away from the top of the chamber, only part of the synthesis gas goes up, which avoids slag flushing and partially overheated.

According to one embodiment of the present invention, characterized in, a thermoscope is set inside said cooling reaction part.

According to one embodiment of the present invention, characterized in, said upper cooling purification part includes a rapid cooling device, an ash pool, a synthesis gas outlet.

According to one embodiment of the present invention, characterized in, said primary cooling device sprays proper amount of cooling materials to lower the temperature of the synthesis gas below t2 (softening temperature of the ash), and above 800° C.

According to one embodiment of the present invention, characterized in, said nozzles are arranged so that the reactants are sprayed to create a hedge effect (the axis of opposite nozzles coincide) or a rotary cut effect (relative to the axis of the nozzle, tangent with a same circle), said hedge effect or rotary cut effect can occur between nozzles on the same level or on the different levels.

According to one embodiment of the present invention, characterized in, said nozzles are arranged at the lower part from the middle of the chamber.

Since part of the gas and the coarse slag descends or goes downwards, so that it can avoid the water steam, which are created when cooling the slag, to go into the chamber and cool down the slag at the slag outlet, moreover, the high temperature crude synthesis gas goes down and thus provides enough heat at the slag outlet so that the solid slag at this place are avoided to accumulate; when the device is not operating stably, excessive slag is solidifying and building up at the slag outlet, in order to avoid the slag block and the system break down, it is only necessary to increase the volume of the gas which goes downwards to melt the solid cinder (solid slag).

Simultaneously most of the gas ascends or moves upward through the vertical device. If most of the gas is going upwards, in order to provide enough space for reaction, it is only necessary to arrange the nozzle at the lower-middle part of the chamber at the gasification reaction part, so that the high temperature zone of the gasification reaction part is far away from the top of the chamber, which also reduces the erosion of the fire resistant material on the top of the chamber caused by the liquid slag flushing; also at the upper outlet, a cooling device is arranged, so that it can lower the temperature at the top of the chamber, and effectively avoid the overheating at the top of the chamber, to eliminate the safety risks.

The method of present invention can proceed in any suitable devices, preferably in the vertical device of present invention. See FIG. 2.

With the above mentioned solutions, the technical effects of the present invention become quite apparent:

1. The present invention uses a structure where the crude synthesis gas can exit from both the top and the bottom of the device, so on one hand to avoid the slag block at the slag exit which otherwise happens when using the upper gas exit solution, and on the other hand, to avoid the temperature excursion on the top of the device which otherwise occurs when using the bottom gas exit solution;
2. Since the cooling reaction section is added, the carbon conversion is improved, and the ratio of hydrogen:carbon is raised;
3. With the structure where the gas can exit from both the top and the bottom of the device, the amount of the water which is used for rapid cooling is minimized;
4. The present invention uses multiple nozzles arrangement, which is good for achieving complete reaction and maximizing efficiency of the equipment.

BRIEF DESCRIPTION OF THE DRAWINGS

The above and other features of the present invention will become more apparent by describing in detail exemplary embodiments thereof with reference to the accompanying drawings, in which.

The numbers in the drawings indicate.

Figure 1:
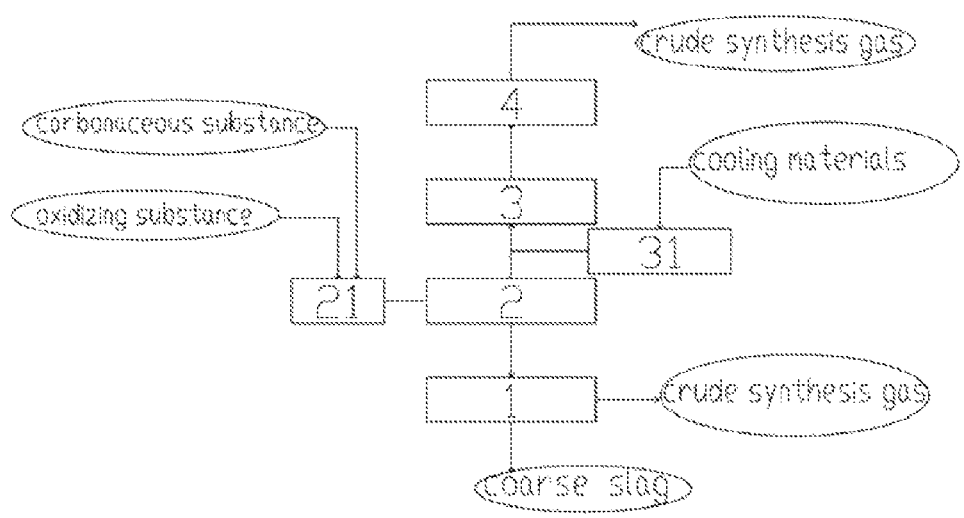
FIG. 1 is an illustrative view of the gasification method of the present invention.

1. bottom cooling purification part or section; 11. downwards rapid cooling device; 12. downstream pipe; 13. bottom synthesis gas outlet; 14. upstream pipe; 15. slag pool; 16. slag outlet; 2. gasification reaction part or section; 21. nozzle; 22. gasification chamber; 23. gasification chamber water cooling wall; 3. cooling reaction part or section; 31. primary cooling device; 4. upper cooling purification part; 41. upstream rapid cooling device; 42. baffle pipe; 43. baffle device; 44. spray device; 45. segregation device; 46. upper synthesis gas outlet; 47. ash pool; 5. shell.

DETAILED DESCRIPTION OF PREFERRED EMBODIMENTS

Exemplary embodiments of the present disclosure will be described hereinafter in detail with reference to the attached drawings, wherein the same reference numerals refer to the same elements. The present disclosure may, however, be embodied in many different forms and should not be construed as being limited to the embodiment set forth herein.

Example 1

As shown in FIG. 1, a method of carbonaceous substance powder gasification, characterize in, including the following steps:

Using 8 nozzles to spray the carbonaceous substance-coal powder with the gasification agent-mist of water steam into the gasification reaction part 2 of the equipment, in the environment of high temperature 1200° C. to 1800° C., high pressure of 4.5 MPa, they rapidly react, and create crude synthesis gas whose main components are CO and H2 and ashes whose main components is inorganic substance.

About 25% of the high temperature crude synthesis gas and most of the ashes cinder flow down into the cooling purification part 1, the cleaned and purified crude synthesis gas is then delivered to the following procedures, the quenched ashes cinder are exhausted from the equipment through the cinder exit.

About 75% of the high temperature crude synthesis gas and the high temperature ashes flow up and mix with the water mist to lower the temperature, and then flow into the cooling reaction part 3, at this stage, the carbon which is not fully reacted will again react with the supplemented $H_2O$, then further improve the carbon conversion and lower the temperature, and the ratio of hydrogen:carbon is also raised.

After the reaction, the crude synthesis gas and the flying ash keep flowing up, is rapidly cooled, and then go into the upper cooling purification part 4, passing through the water bath, tray separation, cyclone separation, etc. to be cooled and purified, eliminate the dust in the crude synthesis gas, then the low temperature crude synthesis gas which is relatively clean will be then delivered to the following procedures.

Example 2

Figure 2:
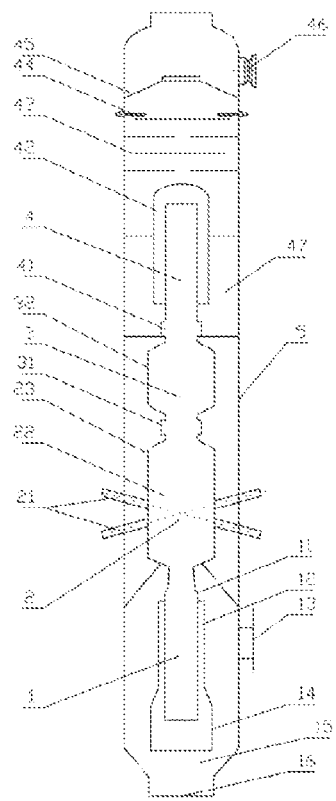
FIG. 2 is an illustrative view of a device of the present invention.

See FIG. 2, a device for carbonaceous substance gasification, characterized in, includes bottom cooling purification part 1, gasification reaction part 2, cooling reaction part 3, upper cooling purification part 4, shell 5.

Said bottom cooling purification part 1 is set at the bottom of the device, its inlet is connected with the lower outlet of gasification reaction part 2. Said bottom cooling purification part 1 includes downwards rapid cooling device 11, downstream pipe 12, bottom synthesis gas outlet 13, upstream pipe 14, slag pool 15, slag outlet 16, etc.

Said gasification reaction part 2 is set at the lower part from the middle of the device. Six nozzles are arranged around the periphery of gasification reaction part 2; nozzles are arranged on one level, the bottom outlet of said gasification reaction part 2 is connected with the bottom cooling purification part 1, and its upper outlet is connected with the cooling reaction part 3.

Said nozzles 21 are arranged so that the sprayed reactant can go in a path which creates a rotary cut (relative to the axis of the nozzle, tangent with a same circle), and it's a rotary cut of the nozzles on the same level.

Said cooling reaction part 3 is set on the upper part from the middle of the device. Its inlet is connected with the upper outlet of the gasification reaction part 2. A primary cooling device 31 is arranged at the connected part, to spray a proper amount of water mist, so that on one hand cooling the gas, and on the other hand complementing the reactant, to further proceed the carbon gasification reaction of the carbon in the ash at the cooling reaction part 3.

After the reaction, the crude synthesis gas keeps going up, passing through the upstream rapid cooling device 41 to be rapidly cooled, then passing through the baffle pipe 42, going into the ash pool 47 to be water bathed, then through the baffle device 43 to separate the big particles in the ash, going through the spray device 44 to be moisturized, then passing the segregation device 45 to remove the particles in the synthesis gas, then from the upper synthesis gas outlet 46 to be delivered to the following procedures.

Said upper cooling purification part 4 is set on the top of the device, its inlet is connected with the outlet of the cooling reaction part 3, it includes the upstream rapid cooling device 41, baffle pipe 42, baffle device 43, spray device 44, segregation device 45, upper synthesis gas outlet 46, ash pool 47, etc.

Example 3

See FIG. 2, a device for carbonaceous substance gasification, characterized in, includes bottom cooling purification part 1, gasification reaction part 2, cooling reaction part 3, upper cooling purification part 4, shell 5.

Said bottom cooling purification part 1 is set at the bottom of the device, its inlet is connected with the lower outlet of gasification reaction part 2. It includes downwards rapid cooling device 11, slag pool, slag outlet, synthesis gas outlet, etc.

Said gasification reaction part 2 is set at the lower part from the middle of the device. Four nozzles are arranged on each level around the periphery of gasification reaction part 2; nozzles are arranged on 2 levels. The bottom outlet of said gasification reaction part 2 is connected with the bottom cooling purification part 1, and its upper outlet is connected with the cooling reaction part 3.

Said nozzles 21 are arranged so that the reactants are sprayed to create a hedge effect (the axis of opposite nozzles coincide), said hedge effect can occurs between nozzles on different levels.

Said cooling reaction part 3 is set on the upper part from the middle of the device. Its inlet is connected with the upper outlet of the gasification reaction part 2. A primary cooling device 31 is arranged at the connected part, to spray a proper amount of water mist, so that on one hand cooling the gas, and on the other hand complementing the reactant, then to further proceed the carbon gasification reaction of the carbon in the ash at the cooling reaction part.

After the reaction, the crude synthesis gas keeps rapid cooling device 41 to be rapidly cooled again, then through the baffle pipe 42, goes into the ash pool 47 to be water bathed, then through the baffle device 43 to separate the big particles in the ash, goes through the spray device 44 to be moisturized, then through the segregation device 45 to remove the particles in the synthesis gas, then from the upper synthesis gas outlet 46 to be delivered to the following procedures.

What is claimed is:

1. A method for carbonaceous substance powder gasification in a vertical device, comprising the steps of:
   i) reacting a carbonaceous substance in powder form in a vertical device with an oxygen-containing gasification agent at a temperature which generates a crude synthesis gas comprising CO, $H_2$, and ash;
   ii) allowing a first portion of said crude synthesis gas to descend with most of the ash wherein the heat of the crude synthesis gas prevents buildup of slag;
   iii) removing the ash from said first portion of crude synthesis gas and cooling to form a first purified synthesis gas;
   iv) removing said first purified synthesis gas and removing said ash from the bottom of said vertical device;
   v) simultaneously allowing a second portion of said crude synthesis gas to ascend through said vertical device;
   vi) mixing said second portion of crude synthesis gas with a cooling material to lower the temperature;
   vii) submitting the cooled second crude synthesis gas portion to a second oxidation reaction by mixing with an oxygen-containing gasification agent at a lower temperature than step i) to form a reoxidized synthesis gas;
   viii) cooling said reoxidized synthesis gas and removing the ash to form a second purified synthesis gas; and
   ix) removing said second purified synthesis gas from the top of said vertical device.

2. The method of carbonaceous substance powder gasification according to claim 1, wherein in step i) multiple nozzles are used to spray the carbonaceous substance and the oxygen-containing gasification agent into a gasification reactor in said vertical device.

3. The method of carbonaceous substance powder gasification according to claim 1, wherein step i) is performed at a temperature between 1200° C. and 2000° C. and a pressure between 0.1 MPa and 11 MPa.

4. The method of carbonaceous substance powder gasification according to claim 1, wherein the volume of partially purified synthesis gas from step v) is about 60%-80% (volume/volume) of the crude synthesis gas formed in step i).

5. The method of carbonaceous substance powder gasification according to claim 1, wherein said oxygen-containing gasification agent is selected from the group consisting of water steam, water mist, CO2, and mixtures of two or more thereof.

6. The method of carbonaceous substance powder gasification according to claim 1, wherein the second oxidation reaction of step vii) is performed at a temperature of about 800° C. up to the softening temperature of the ash.

7. The method of carbonaceous substance powder gasification according to claim 1, further comprising the step of:
   iv) when an ash slag blockage occurs which causes the pressure to rise, increasing the volume of said first portion of synthesis gas and slowly raising the temperature so that excess slag can be melted, until the pressure returns to normal.

8. The method of claim 1 further comprising the step of delivering said first and/or second purified synthesis gas to subsequent procedures.

\* \* \* \* \*